(12) United States Patent
Mims (10) Patent No.: US 7,074,339 B1
(45) Date of Patent: Jul. 11, 2006

(54) APPARATUS FOR SEPARATING SOLIDS FROM A LIQUID

(75) Inventor: Norman Kenneth Mims, Lake Monroe, FL (US)

(73) Assignee: Settled Solids Management, Inc, Sanford, FL (US)

( * ) Notice: Subject to any disclaimer, the term of this patent is extended or adjusted under 35 U.S.C. 154(b) by 379 days.

(21) Appl. No.: 10/424,500

(22) Filed: Apr. 28, 2003

Related U.S. Application Data (60) Provisional application No. 60/376,786, filed on Apr. 29, 2002.

(51) Int. Cl.
*C02F 9/00* (2006.01)
*B01D 21/26* (2006.01)
*B01D 35/16* (2006.01)

(52) U.S. Cl. .............. 210/788; 210/806; 210/170; 210/202; 210/206; 210/216; 210/252; 210/256; 210/258; 210/259; 210/297; 210/298; 210/299; 210/512.2

(58) Field of Classification Search ............... 210/170, 210/202, 206, 216, 252, 258, 259, 297, 298, 210/299, 512.1, 512.2, 256, 788, 806
See application file for complete search history.

(56) References Cited

U.S. PATENT DOCUMENTS

| | | | |
|---|---|---|---|
| 3,071,249 A * | 1/1963 | Rains | ............... 210/170 |
| 4,707,277 A | 11/1987 | Mims | |
| 4,818,419 A | 4/1989 | Mims | |
| 4,818,420 A | 4/1989 | Mims | |
| 4,957,622 A | 9/1990 | Mims | |
| 5,013,457 A | 5/1991 | Mims | |
| 5,167,841 A | 12/1992 | Mims | |
| 5,244,308 A | 9/1993 | Mims | |

* cited by examiner

*Primary Examiner*—David A. Reifsnyder
(74) *Attorney, Agent, or Firm*—Frijout, Rust & Pyle P.A.

(57) ABSTRACT

An improved apparatus and method is disclosed for separating solids from a liquid. The apparatus and method comprises a first separator for circulating the solids and the liquid to concentrate the solids within the liquid. The concentrated solids are discharged into a second separator. The second separator extends upwardly for separating and discharging the concentrated solids from the liquid.

15 Claims, 11 Drawing Sheets

APPARATUS FOR SEPARATING SOLIDS FROM A LIQUID

CROSS-REFERENCE TO RELATED APPLICATIONS

This application claims benefit of U.S. Patent Provisional application Ser. No. 60/376,786 filed Apr. 29, 2002. All subject matter set forth in provisional application Ser. No. 60/376,786 is hereby incorporated by reference into the present application as if fully set forth herein.

BACKGROUND OF THE INVENTION

1. Field of the Invention

This invention relates to separation and more particularly to an apparatus and a method for separating solids from a liquid such as separating solids settled or suspended within a liquid.

2. Background of the Invention

The prior art has known various devices for separating solids from a liquid. A particular problem exists for separating large volumes of solids from large volumes of liquid. This particular problem exists in the separation of large volumes of solids from sewage treatment plants, water retention ponds, channel dredging or similar problems of separating large volumes of solids.

Municipal waste or the like is conveyed to a local sewage treatment plant in which the raw sewage is treated in various sedimentation processes after which the primary sludge is further treated in an aeration tank or basin for biological degradation thereof. Although most sewage treatment plants incorporate bar screens and grit chambers for removing entrained granular material from the sewage to be treated, in practice a considerable amount of granular material reaches the aeration basin where such granular material accumulates.

The primary function of the aeration basin or aeration tank is to supply a steady stream of oxygen through the sewage contained in the aeration basin. Such oxygen enhances the ability of bacteria comprising the bio-mass within the aeration basin to feed upon and thereby degrade and decompose the sewage. However, as the level of granular material accumulates within the aeration basin, the effective depth of the basin decreases. Therefore, the flow path of the air through the sewage aeration basin becomes shortened as the granular material accumulating within the aeration basin increases. This decrease in the distance travelled by the air through the sewage to be treated reduces the efficiency with which the sewage may be treated by such oxygen and this results in the requirement for more air for longer periods of time to compensate for the decrease in efficiency of the system as the granular material displaces the capacity of the aeration tank.

Another problem encountered with the accumulation of granular material within the aeration basin is that occasionally such accumulated solids will break loose and will travel downstream from the aeration basin and actually plug air diffusers and the like thereby reducing the efficiency of the aeration process. Furthermore, if such granular material is carried completely over into an adjacent treatment tank, plugging of percolation ponds or drain fields may occur.

Above all, due to the accumulation of sand or similar granular material at the base of the aeration basin, the overall cost of operating the sewage treatment plant will increase because not only will the capacity of the aeration basin be reduced thereby reducing the overall effectiveness of the plant, but also because sewage plants are subject to peak flows at certain hours of the day. These flow surges are normally buffered by the correct sizing of the aeration chamber or basin. However, when the aeration basin includes an accumulation of sand and other solids, this buffering effect is impaired and solids will pass through the aeration tank without being properly treated with the oxygen stream.

When sand or the like accumulates within the base of an aeration basin, not only are greater loading requirements placed upon aeration equipment and ancillary pumping gear, but the reduced efficiency of the aeration tank requires greater amounts of chlorination to meet required regulations and all these associated inefficiencies result in a greatly increased cost when operating the sewage plant.

In the past, when sand or the like has accumulated in the bottom of an aeration tank, two alternative recourses have been available to the sewage plant operator. Firstly, the sewage may be diverted if practical to an alternative treatment plant while the sand is removed from the aeration chamber manually or secondly, the sewage contained within the aeration tank must be removed therefrom into transportation tanks for removal to an alternative plant. In either case, it is necessary to shut down the sewage plant while such removal of granular material from the aeration tank is carried out. Additionally, the removal of sand or similar granular material from the bottom of an aeration basin is a time consuming and unpleasant occupation, and results in removal of the beneficial biomass as well.

In my prior inventions, I disclosed an apparatus and a method for removing granular material from an aeration basin while such aeration basin is still filled with sewage, without interrupting the normal operation of the sewage plant. The apparatus provided a collector disposed within the aeration basin for collecting the granular material from the base of the basin and for pumping the granular material to a first separator where the granular material settles to the bottom of the first separator and is conveyed by a conveyor for separating the granular material from the waste material and for pumping waste water and sewage back from the first separator to the aeration basin.

U.S. Pat. No. 4,707,277 to Mims discloses an apparatus for removing granular material from an aeration basin of a sewage plant. The apparatus includes a collector for collecting the granular material from the aeration basin. A first pump includes an input and an output port with the input port being in fluid tight communication with the collector for pumping and removing the granular material out of the aeration basin together with a portion of the sewage and waste water contained within the basin. A float is disposed on the surface of the sewage within the aeration basin, the float adjustably supporting the collector relative to the granular material to be removed. A buoyant conduit is connected to the output port of the first pump such that the buoyant conduit conducts the removed granular material, sewage, wastewater and bio-mass from the float away from the aeration basin. A mobile reservoir includes an inlet and an outlet, the inlet being connected to the buoyant conduit such that the granular material, sewage and wastewater removed from the aeration basin flows into the reservoir and the granular material settles towards the outlet. A separator having a first and a second opening is disposed with the first opening adjacent to and in fluid communication with the outlet of the reservoir. The separator extends angularly relative to the reservoir such that as the waste water and entrained granular material are conveyed away from the first opening of the separator towards the second opening, the waste water and bio-mass drains back towards the first opening and the granular material is separated from the waste water and is conveyed towards the second opening of the separator for discharge therefrom.

U.S. Pat. No. 4,818,419 to Mims discloses a filter device. A collector is positioned proximate the clogged filter medium for collecting the clogged filter medium together with a portion of the water contained within a tank housing the clogged granular filter medium. An input of a first pump is connected in fluid tight communication with the collector. A conduit is connected in fluid tight communication with an output port of the first pump. The conduit is connected to a reservoir. The clogged granular filter medium and the portion of water is pumped by the first pump from the tank of the granular filter device such that a slurry of clogged granular filter medium flows from the granular filter device through the collector, first pump and conduit towards the reservoir such that during the transit through the collector, first pump and conduit the clogged granular filter medium is agitated causing an intergranular frictional action among the clogged granular filter medium thereby loosening the clogging material from the granular filter medium to form a suspension of loosened clogging material and entrained granular filter medium. The granular filter medium is separated from the suspension of loosened clogging material by conveying granular filter medium angularly relative to the reservoir thereby permitting the suspension of loosened clogging material and granular filter medium to be conveyed away from the first opening of the separator towards a second opening of the separator, so that the suspension of loosened clogging material drains back towards the first opening thereby separating the granular filter medium from the suspension of loosened clogging material to form a cleaned granular filter medium. The cleaned granular filter medium is collected from the second opening of the separator and transported back to the granular filter device.

U.S. Pat. No. 4,818,420 to Mims discloses a liquid filtering and backwashing apparatus comprising a filter tank having a first outlet valve and a filter cell disposed within the filter tank. The filter cell includes a conduit and an outer member with the outer member spaced apart relative the conduit with a filtering medium positioned between the conduit and the outer member. A plurality of openings in the outer member enable fluid communication between the liquid to be filtered in the filter tank and the filtering medium. The conduit is provided with a plurality of slits to enable fluid communication between the filtering medium and interior of the conduit while retaining the filtering medium external the conduit. A backwash holding tank in fluid communication with the conduit collects the filtered liquid. The backwash holding tank includes a second outlet valve for the filtered liquid to drain. When the filter cell becomes clogged with the filter clogging material the first outlet valve is opened, the second outlet valve is closed, and the backwash holding tank is provided with compressed gas through an inlet valve forcing filtered liquid back into the filter cell and filter tank thereby backwashing the filter cell and filter tank.

U.S. Pat. No. 4,957,622 to Mims discloses an apparatus and method for removing sediment which has settled on the bottom of a pond comprising a frame and a hydrostatic chamber. The hydrostatic chamber includes an aperture to receive the sediment and water proximate the bottom of the pond. A gate controls the size of the opening of the aperture formed in the hydrostatic chamber thereby regulating the ratio of sediment to water entering the hydrostatic chamber. An underwater motive means moves the apparatus along the bottom of the pond causing a wiper to extend into the sediment for scraping, loosening, wiping and plowing the sediment from the bottom of the pond and for directing the bottom sediment toward the aperture upon movement of the frame by the motive means. A vent is used to vent the hydrostatic chamber while a pump is in fluid communication with the hydrostatic chamber to create a pressure differential thereby forcing into the hydrostatic chamber the sediment and fluid proximate the aperture. This sediment and fluid is pumped out for disposal away from the pond.

U.S. Pat. No. 5,013,457 to Mims discloses a liquid filtering and backwashing apparatus comprising a pressurized filter tank having a first outlet valve and a filter cell disposed within the filter tank. The filter cell includes a conduit and an outer member with the outer member spaced apart relative to the conduit with a filtering medium positioned between the conduit and the outer member. A plurality of openings in the outer member enable fluid communication between the liquid to be filtered in the filter tank and the filtering medium. The conduit is provided with a plurality of slits to enable the pressure in the tank to force fluid communication between the filtering medium and interior of the conduit while retaining the filtering medium external the conduit. Means are provided to vary the size of the slits to adjust for differing pressures or filtering requirements. A backwash holding tank in fluid communication with the conduit collects the filtered liquid. The backwash holding tank includes a second outlet valve for the filtered liquid to drain. When the filter cell becomes clogged with the filter clogging material the first outlet valve is opened, the second outlet valve is closed, and the backwash holding tank is provided with compressed gas through an inlet valve forcing filtered liquid back into the filter cell and filter tank thereby backwashing the filter cell and filter tank.

U.S. Pat. No. 5,167,841 to Mims discloses an apparatus and method for removing granular material and debris from a basin of a body of water. The apparatus comprises a first pump having an input port for collecting granular material, debris and water from of the basin. A conduit conducts the removed granular material, debris and water from the basin to a mobile reservoir. An Archimedean screw conveyor extends angularly relative to the mobile reservoir for conveying the granular material, debris and water away from the mobile reservoir and for separating the granular material and debris from the water. A second pump discharges the water from the mobile reservoir back into the basin.

U.S. Pat. No. 5,244,308 to Mims discloses an apparatus and method for an improved mobile apparatus for removing contaminants from a site containing granular material with the contaminants being affixed thereto. The mobile apparatus comprises a processor which extracts the granular material containing the contaminants from the site. The processor containing a liquid agent separates the contaminants from the granular material and creates a slurry comprising the granular material, the liquid agent and the contaminants. A conduit conducts the slurry from the processor to a mobile reservoir. A separator extending angularly relative to the mobile reservoir conveys the granular material, the liquid agent and the contaminants away from the mobile reservoir and separates the granular material from the liquid agent containing the contaminants.

It is an object of the present invention to improve upon my prior inventions and to provide an improved apparatus and method for separating a solid from a liquid having an enhanced performance.

Another object of this invention is to provide an improved apparatus and method for separating a solid from a liquid incorporating a cyclone separator for concentrating the solids within the liquid prior to separating the solids from liquid.

Another object of this invention is to provide an improved apparatus and method for separating a solid from a liquid incorporating a second cyclone separator for concentrating the remaining solids within the liquid after the initial separation process.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

A specific embodiment of the present invention is shown in the attached drawings. For the purpose of summarizing the invention, the invention relates to an improved apparatus for separating solids from a liquid. The apparatus comprises a first separator having an inlet and an outlet. An input pump pumps the solids and the liquid into the inlet of the first separator. The first separator circulates the solids and the liquid within the first separator for concentrating the solids for discharge from the outlet of the first separator. A second separator has a first and a second opening with the first opening communicating with the outlet of the first separator. The second separator extends angularly upwardly for conveying the solids away from the first opening and towards the second opening of the second separator to separate the solids from the liquid.

In a more specific example of the invention, the first separator comprises a first cylindrical cyclone separator defined by a first cylindrical sidewall for circulating the solids and the liquid within the first cylindrical cyclone separator for concentrating the solids about first cylindrical sidewall. The inlet of the first cylindrical cyclone separator is defined in the first cylindrical sidewall and the outlet of the first cylindrical cyclone separator is defined in a lower cylindrical end of the first cylindrical cyclone separator. Preferably, the lower cylindrical end of the first cylindrical cyclone separator is tapered to terminate in the outlet of the first cylindrical cyclone separator.

In another specific example of the invention, the second separator comprises an elongate housing defining the first and second openings. The elongate housing extends angularly relative to the first separator with the second openings being located above the first opening. A spiral conveyor extends between a first and a second end. The spiral conveyor is rotatably supported within the elongate housing with the first and second ends of the spiral conveyor being disposed adjacent to the first and second openings of the second separator. A motor rotates the spiral conveyor for conveying the solids from the first opening to be discharged from the second opening of the elongate housing. The spiral conveyor and the elongate housing define a space therebetween for enabling the liquid to drain downwardly along the housing towards the first opening.

In another embodiment of the invention, a first separator has an inlet and an outlet with an input pump for pumping the solids and the liquid into the inlet of the first separator. The first separator circulates the solids and the liquid within the first separator for concentrating the solids for discharge from the outlet of the first separator. A second separator has a first and a second opening with the first opening communicating with the outlet of the first separator. The second separator extends angularly upwardly for conveying the solids away from the first opening and towards the second opening of the second separator to separate the solids from the liquid. A third separator has an inlet and an outlet. A transfer pump pumps the solids and the liquid from the second separator into the inlet of the third separator. The third separator circulates the solids and the liquid within the third separator for concentrating the solids for discharge from the outlet of the third separator. The outlet of the third separator communicates with the first opening of the second separator for further separating the solids from the liquid.

The invention is also incorporated into the method of separating solids from a liquid comprising the steps of pumping the solids and liquid into a first separator. The solids are concentrated within the liquid in a cyclone separator. The concentrated solids are separated from the liquid with an angularly orientated second separator to convey the concentrated solids from a first opening to be discharged from a second opening. The liquid is removed from the separator process.

In another embodiment of the method of the invention, the solids and liquid are pumped into a first cyclone separator. The solids are concentrated within the liquid in the first cyclone separator. The concentrated solids are separated from the liquid with an angularly orientated second separator to convey the concentrated solids from a first opening to be discharged from a second opening. The remaining solids and liquid are pumped from the second separator into a third cyclone separator. The remaining solids are concentrated within the liquid in the third cyclone separator. The concentrated remaining solids are separated from the liquid with the angularly orientated second separator to convey the concentrated solids from a first opening to be discharged from a second opening. The liquid is removed from the separator process.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
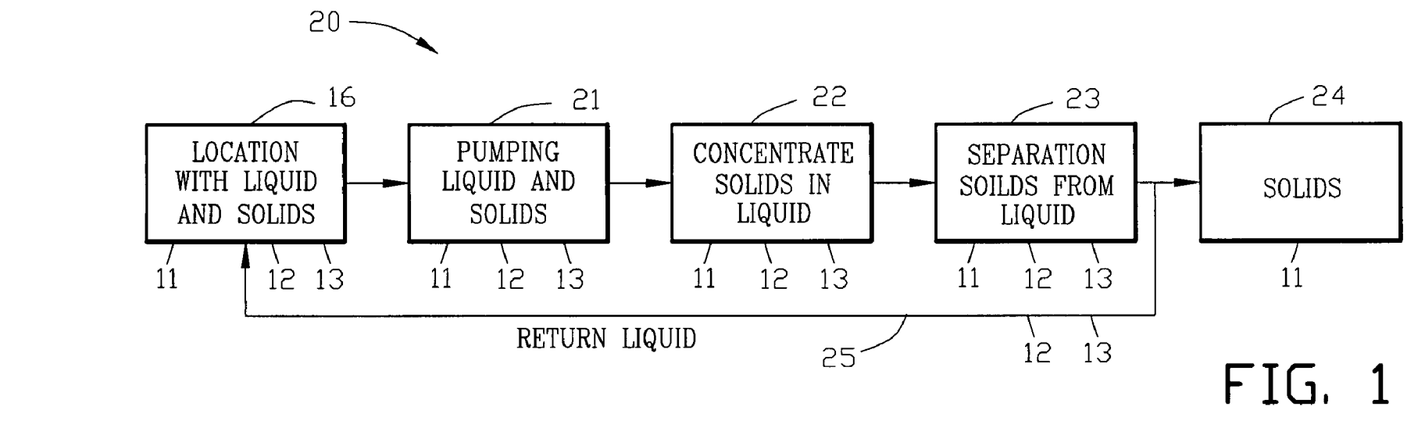
FIG. 1 is a block diagram of a first embodiment of a method of separating solids from a liquid.

FIG. 1 is a block diagram of a first embodiment of a method 20 of separating solids 11 from a liquid 12. The method 20 comprises the step 21 of pumping the solids 11 and liquid 12 from a location 16. A biologically active material 13 may be suspended within the liquid 12. The solids 11 within the liquid 12 are concentrated within the liquid in the process step 22. The concentrated solids 11 are separated from the liquid 12 in the process step 23. The concentrated solids 11 are separated from the liquid 12 with an angularly orientated separator for discharging conveying concentrated solids 11 in the process step 24. The method 20 comprises the step 25 of removing the liquid 12 from the separator process. Preferably, the liquid 12 is returned to the location 16.

Figure 2:
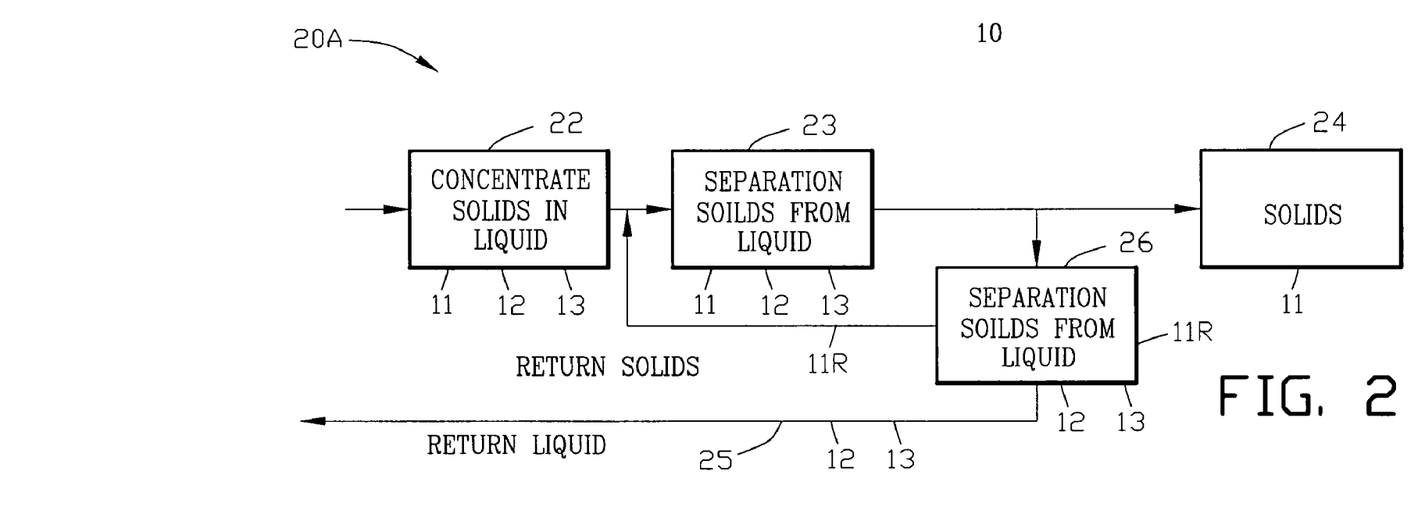
FIG. 2 is a partial block diagram of a second embodiment of a method of separating solids from a liquid.

FIG. 2 is a partial block diagram of a second embodiment of a method 20A of separating solids 11 from a liquid 12. The second embodiment of a method 20A is similar to the method 20 shown in FIG. 1 with the addition of the process step 26. In this second embodiment of a method 20A, the liquid 12 removed from the separator process is directed to another process 26 of concentrating the remaining solids 11 within the liquid 12.

Figure 3:
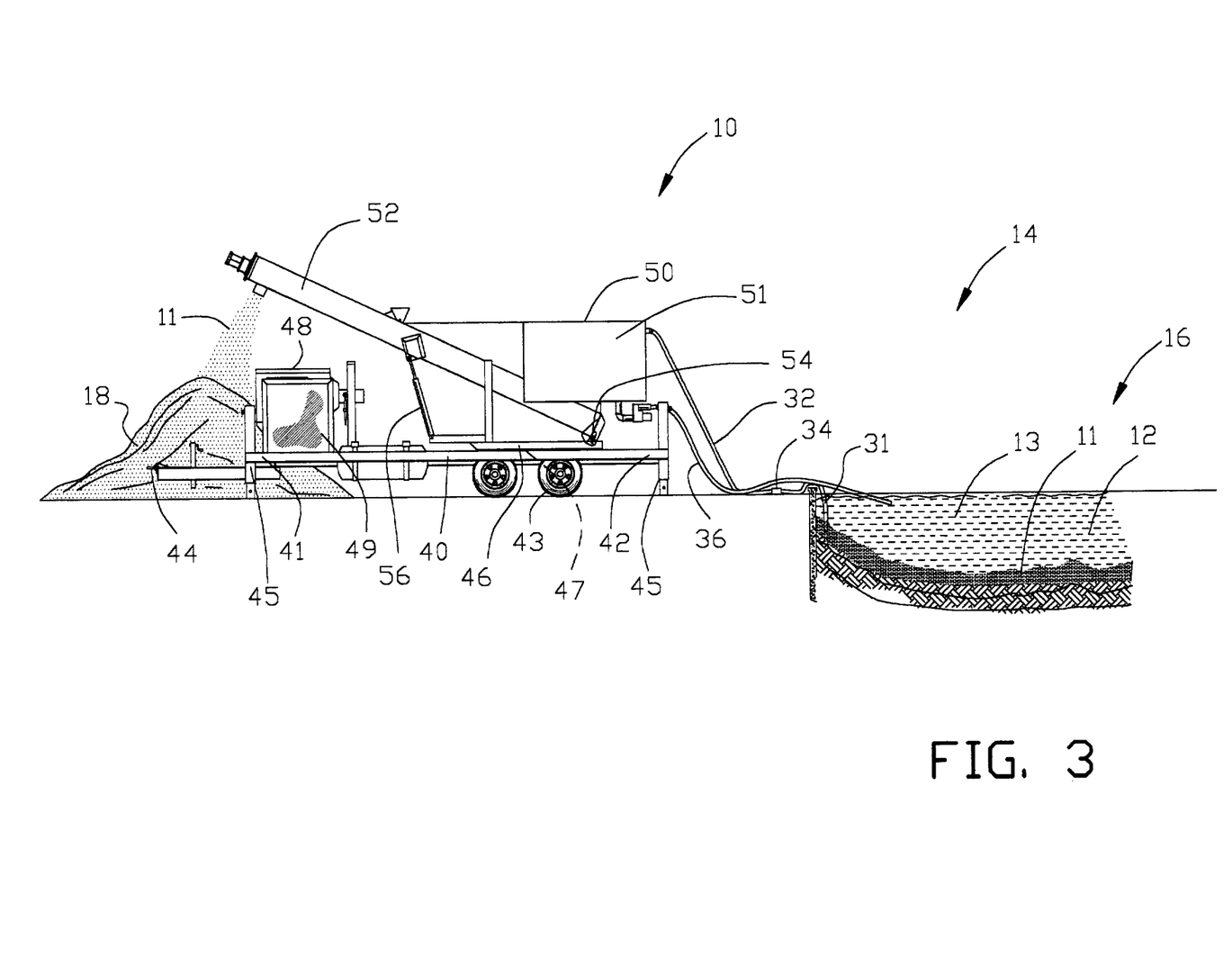
FIG. 3 is a side view of an apparatus of the present invention for separating solids from a liquid withdrawn from a basin and returning the liquid to the basin.

FIG. 3 illustrates apparatus 10 for separating solids 11 from a liquid 12 incorporating the present invention. The solids 11 may include sand, gravel and/or other solid particulate matter whereas the liquid 12 is shown as water. A biologically active material 13 may be suspended within the liquid 12.

The apparatus 10 is shown situated at a remote location 14 adjacent a basin 16 containing the solids 11 and the liquid 12. The basin may be representative of a sewage treatment basin, a water retention pond, a waterway channel or the like. When the apparatus 10 operates with a sewage treatment basin, the biologically active material 13 is present within the liquid 12.

The apparatus 10 withdraws solids 11 and the liquid 12 from the basin 16 through a first input hose 31 connected by an input pump 34. The input pump 34 withdraws the solids 11 and the liquid 12 such as sand and water or the like from the basin 16 and pumps the solids 11 and the liquid 12 through a second input hose 32 into the apparatus 10.

The apparatus 10 separates the solids 11 from the liquid 12 and discharges the solids 11 into a pile 18. In the alternative, the solids 11 may be directly loaded into a truck or other suitable carrier such as a barge or the like. The liquid 12 separated from solids 11 is returned to the basin 16 by an output hose 36.

The apparatus 10 of the present invention operates in a manner similar to my prior U.S. Pat. No. 4,707,277. However, the improve apparatus 10 of the present invention overcomes many of the disadvantages found in my prior system. The apparatus 10 of the present invention provides the superior material processing as well as superior overall results as will become apparent from the description hereinafter.

Figure 4:
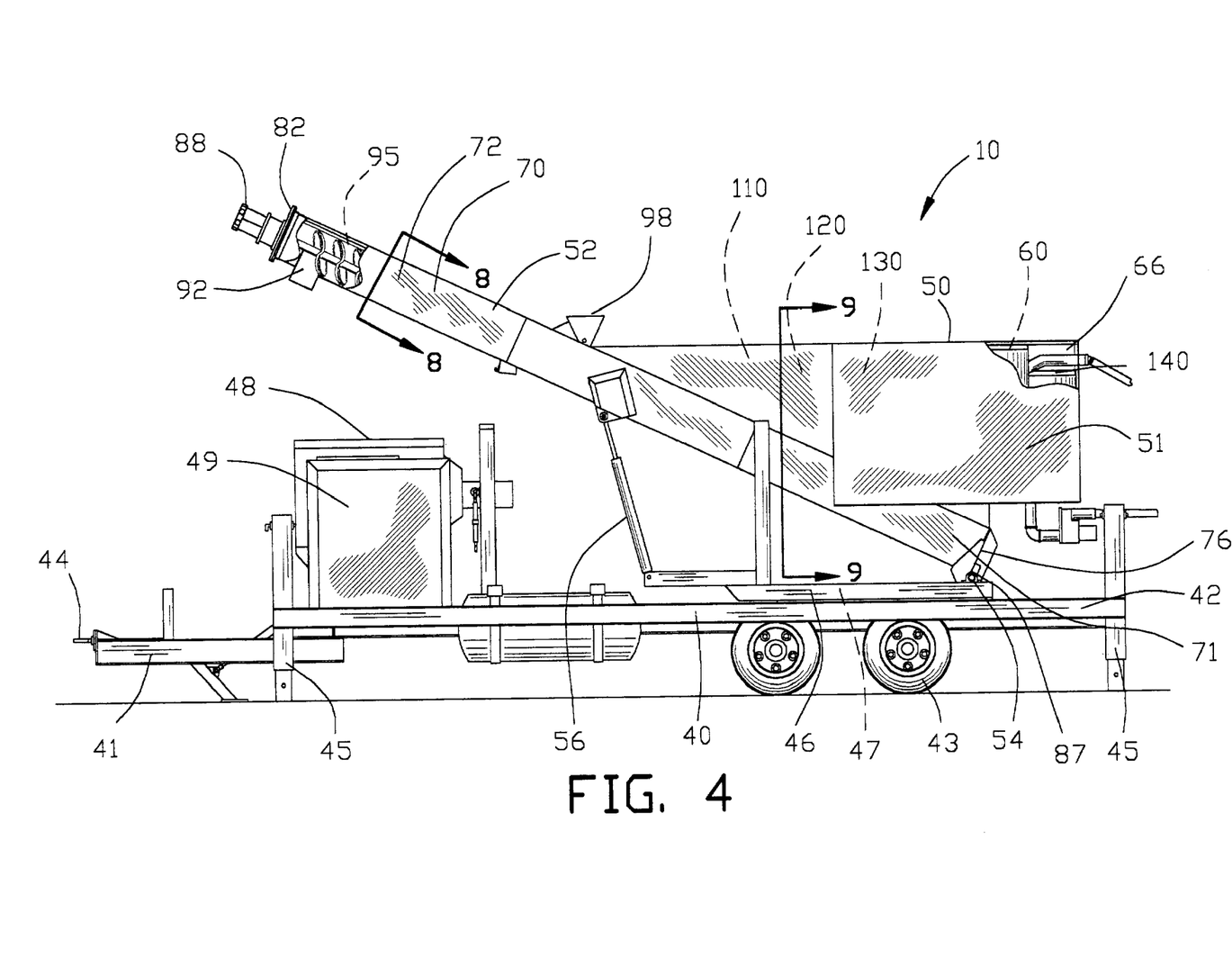
FIG. 4 is an enlarged side view of the apparatus of FIG. 3.
Figure 5:
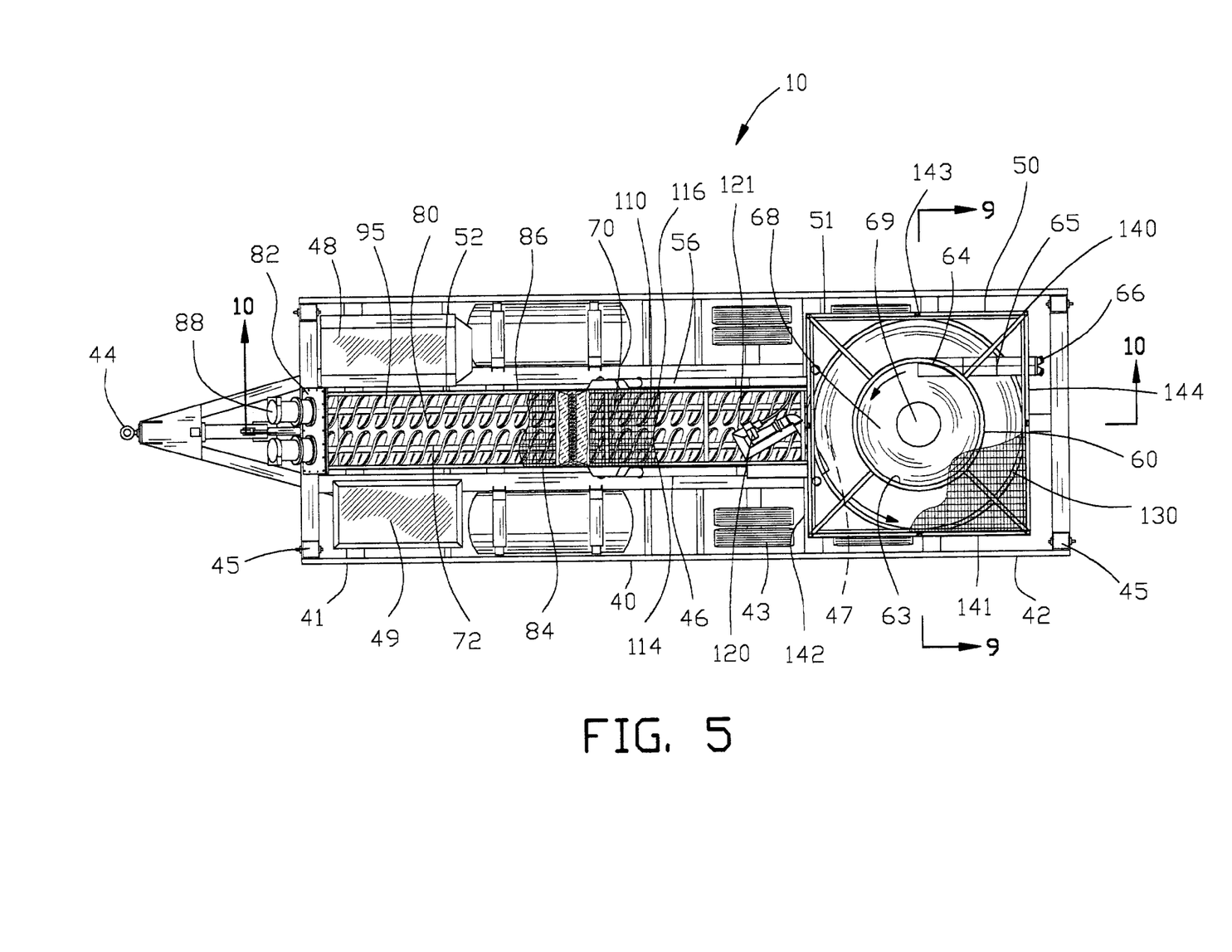
FIG. 5 is a top view of FIG. 4.

FIGS. 4 and 5 are enlarged side and top views of the improved apparatus 10 for separating solids from liquid shown in FIG. 3. The apparatus 10 comprises a frame 40 extending between a first end 41 and a second end 42. The frame 40 is supported by plurality of wheels 43 with a trailer hitch 44 being located at the first end 41 of the frame 40 for enabling the improved apparatus 10 to be towed by a truck to the remote location 14. A plurality of lifting jacks 45 are secured to the corners of the frame 40 for elevating the frame 40 from the ground to stabilize the apparatus 10 during operation.

The frame 40 includes a diesel engine 48 for driving a hydraulic pump 49 for providing power to the apparatus 10 as well as providing power to the input pump 34. Preferably, the apparatus 10 and all associated motors and actuators work hydraulically enabling the apparatus 10 to be operated at a remote location without the need for external power. The frame 40 supports a rotatable frame 46 rotatably mounted to the frame 40 by a shaft 47. The rotatable frame 46 is rotated on the shaft 47 by a rotational actuator (not shown).

The improved apparatus 10 includes a separator assembly 50 comprising a first separator portion 51 and a second separator portion 52. The separator assembly 50 is pivotably mounted to the rotatable frame 46 by a pivot 54. Plural actuators 56 pivot the separator assembly 50 between an operative position shown in FIGS. 3 and 4 and a transporting position shown in FIG. 6.

Figure 6:
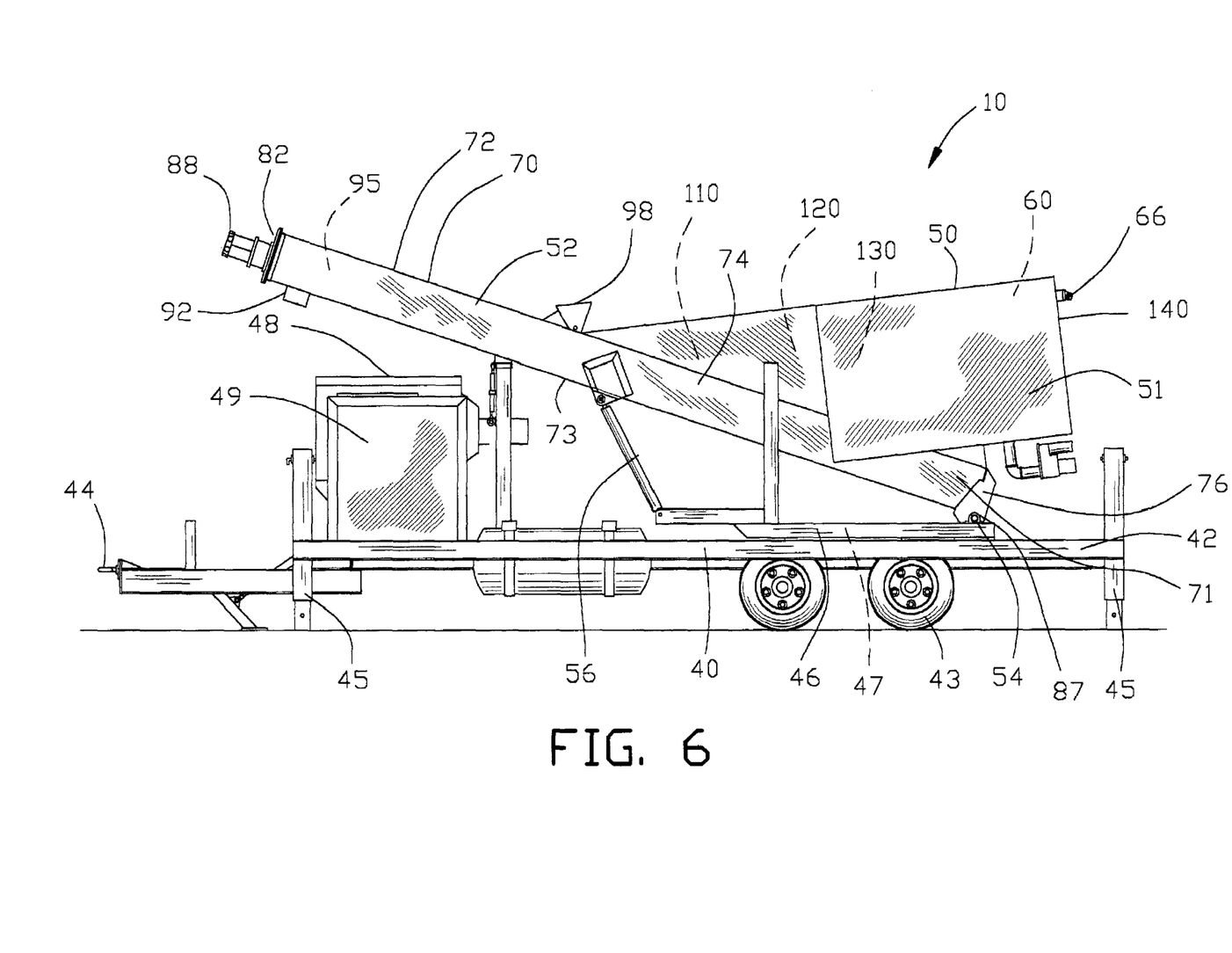
FIG. 6 is a view similar to FIG. 4 illustrating the pivoting of the separating apparatus of the present invention for transportation.

FIG. 6 illustrates the separator assembly 50 in a transporting position. When the separator assembly 50 in a transporting position, the improved apparatus 10 is suitable for transportation in accordance with United States Department of Transportation standards for semi-tractor trailer operation.

Figure 7:
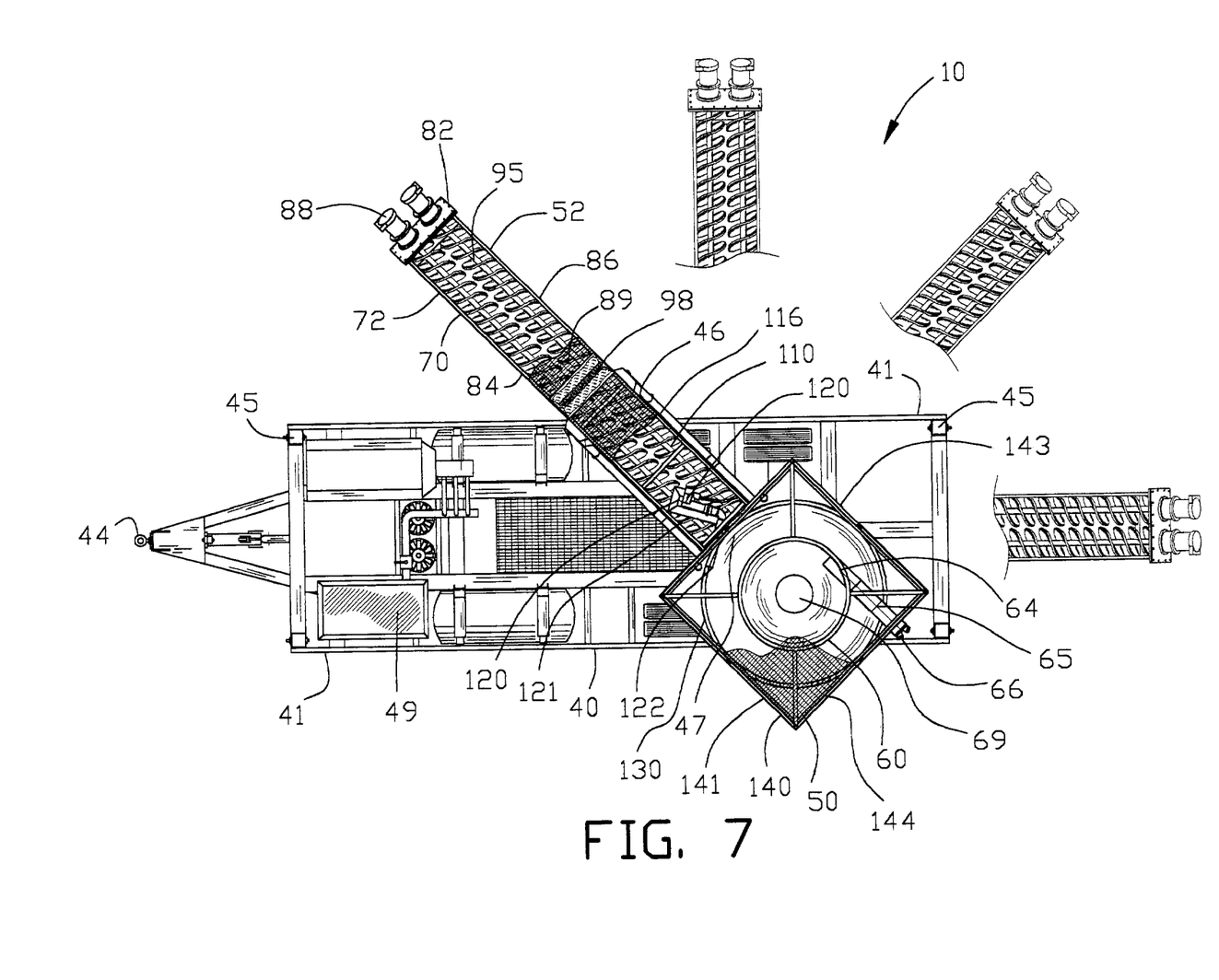
FIG. 7 is a view similar to FIG. 4 illustrating the various rotational positions of the separating apparatus of the present invention.

FIG. 7 illustrates the separator assembly 50 in various rotational positions relative to the frame 40. The rotation of the rotatable frame 46 on shaft 47 positions the second separator portion 52 to discharge the solids at various positions about the frame 40 of the improved apparatus 10. The rotatable frame 46 enables the solids 11 to be discharged into the pile 18 shown in FIG. 3 or may be directly loaded into a truck or other suitable carrier such as a barge or the like.

Figures 8, 9, 10:
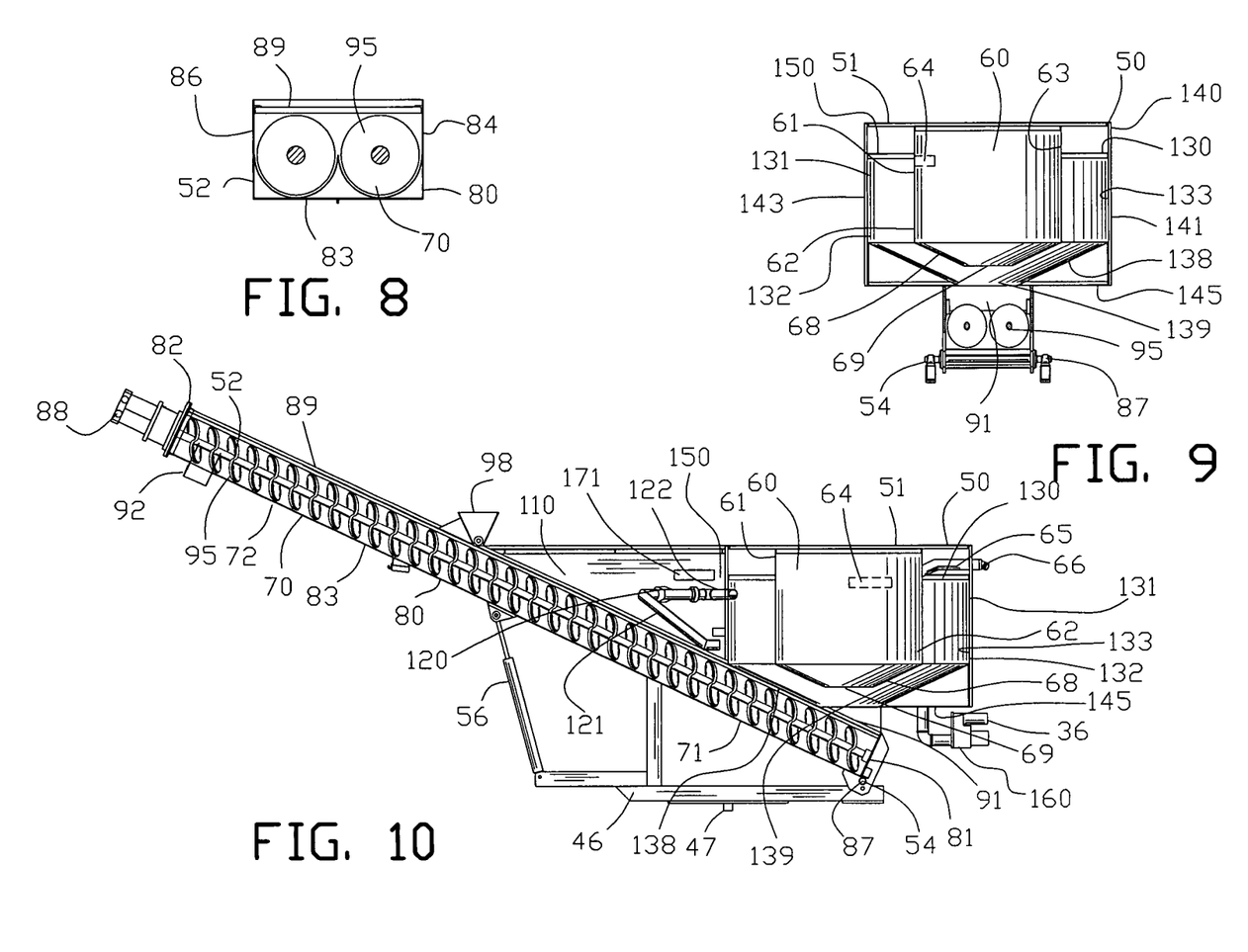
FIG. 8 is a sectional view long line 8—8 in FIG. 4.
FIG. 9 is a sectional view long line 9—9 in FIG. 5.
FIG. 10 is a sectional view long line 10—10 in FIG. 5.
Figures 11, 12:
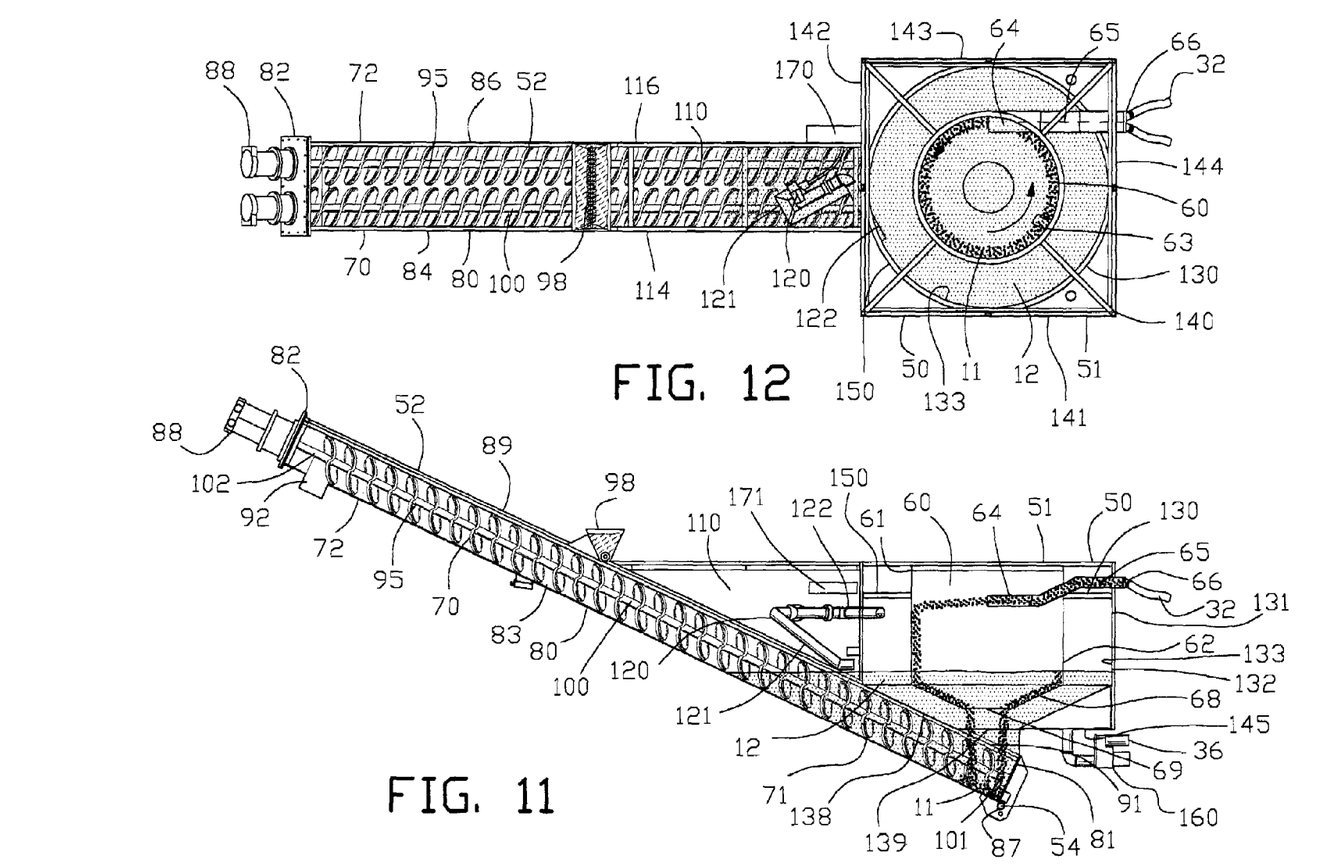
FIG. 11 illustrates the solids and liquid entering a first separator for concentrating the solids within the liquid.
FIG. 12 is a top view of FIG. 11.

FIGS. 8–10 are various sectional views of the separator assembly 50 of FIGS. 4 and 5. The first separator portion 51 comprises a first separator 60 shown as a cyclone separator for concentrating the solids 11 within the liquid 12. The first cyclone separator 60 extends between an upper end 61 and a lower end 62. The first cyclone separator 60 is defined by a cylindrical sidewall 63 with the upper end 61 defining a cylindrical opening commensurate in size with the cylindrical sidewall 63. An input aperture 64 extends through the cylindrical sidewall 63 to be generally tangential with the cylindrical sidewall 63. An input channel 65 interconnects the input aperture 64 to an input fitting 66 for forming a fluid tight fit with the second input hose 32 shown in FIG. 3. The lower end of the first cyclone separator 60 includes a partial tapering wall 68 defining a central output aperture 69. The tapering wall 68 extends angularly downwardly from the cylindrical sidewall 63 and terminates in the central output aperture 69.

The tangential input of the solids 11 and the liquid 12 into the first cyclone separator 60 creates a circulation within the first cyclone separator 60. Preferably, the speed of the tangential input of the solids 11 and the liquid 12 into the first cyclone separator 60 creates a vortex for concentrating the solids 11 within the liquid 12. It is believed that the solids 11 such as sand migrate toward the center of the first cyclone separator 60 whereas and suspended biological active material 13 migrate toward the outer periphery of the first cyclone separator 60. It is believed that the solids 11 such as sand migrate toward the center of the first cyclone separator 60 do the slower vortex velocity within the first cyclone separator 60. Regardless of the specific fluid dynamic mechanism involved, the first cyclone separator 60 concentrates and separates the solids 11 within the liquid 12.

The second separator portion 52 comprises a second separator 70 extending between a first end 71 and a second end 72. The second separator 70 extends upwardly from the first end 71 to the second end 72. The second separator 70 comprises an elongated housing 80 extending between a first end wall 81 and a second end wall 82. The elongated housing 80 includes a bottom wall 83 and plural sidewalls 84 and 86. The first end wall 81 is provided with a bearing 87 whereas the second end wall 82 is provided with a motor 88. The elongated housing 80 includes grate 89 covering the open top of the elongated housing 80 for inhibiting the introduction of undesirable objects therein.

The elongated housing 80 includes a first and a second opening 91 and 92 located adjacent to the first and second end walls 81 and 82 of the elongated housing 80. The first opening 91 allowing for the input of the solids 11 and the liquid 12 from the central output aperture 69 of the first cyclone separator 60. The second opening 92 allows for the discharge of the solids 11.

As illustrated in FIGS. 12–15 the second separator 70 comprises a screw type conveyor 95 commonly referred to as an Archimedes screw. The screw type conveyor 95 is mounted on a shaft 100 extending between a first and a second end 101 and 102. The first end 101 of the shaft 100 is received within the bearing 87 in the first end wall 81 of the elongated housing 80 for journaling the shaft 100. The second end 102 of the shaft 100 is coupled to the motor 88 mounted to the second end wall 82 of the elongated housing 80 for rotating the shaft 100 and the screw type conveyor 95 within the elongated housing 80.

Figure 13:
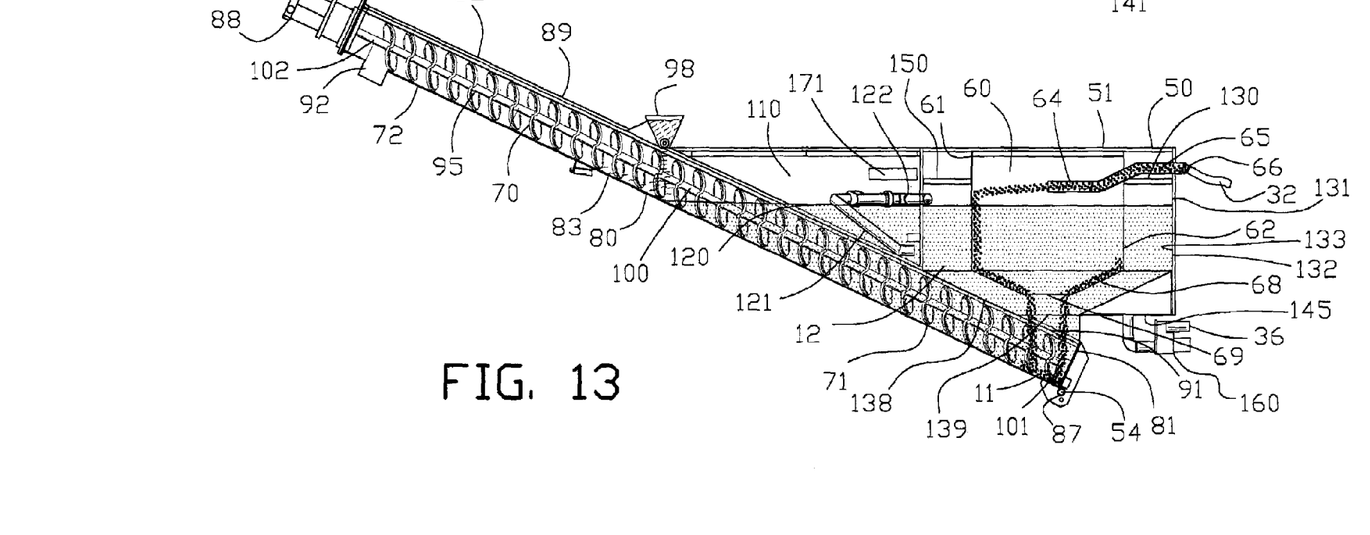
FIG. 13 illustrates the concentrated solids and liquid entering a second separator for separating the concentrated solids from the liquid.
Figure 14:
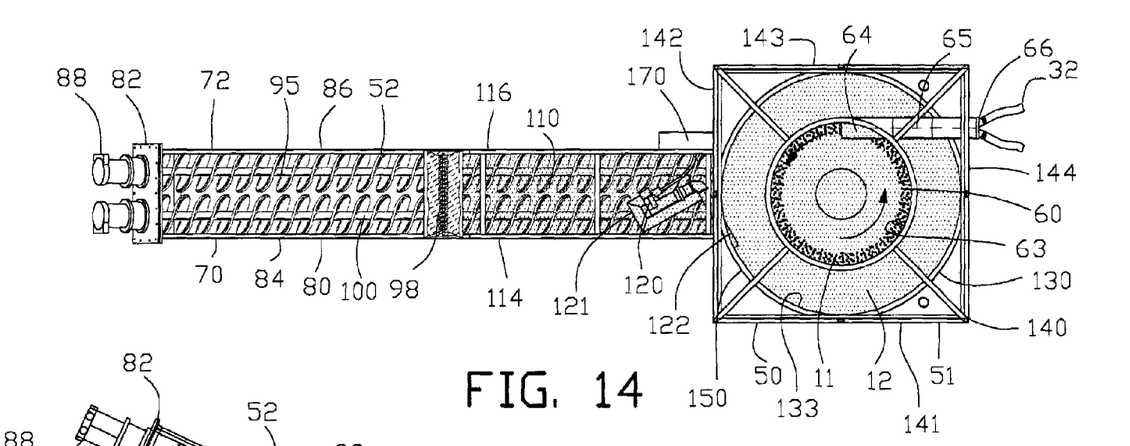
FIG. 14 is a top view of FIG. 13.

The concentrated solids 11 and the liquid 12 emanating from the central output aperture 69 of the first cyclone separator 60 enters the first opening 91 of the elongated housing 80. The solids 11 are conveyed upwardly by the screw type conveyor 95 from the first end wall 81 to the second end wall 82 of the elongated housing 80. The solids 11 entering the first opening 91 are conveyed upwardly by the screw type conveyor 95 to the second opening 92. As the solids 11 are conveyed upwardly by the screw type conveyor 95, the concentrated solids 11 are separated from the liquid 12. The solids 11 are discharged from the second opening 92 of the elongated housing 80 into the pile 18 or may be discharged directly into a truck large or similar type of vehicle. The liquid migrates toward the first end wall 81 of the elongated housing 80.

The apparatus 10 may incorporate an optional dispenser 98 for disinfecting and drying the solids 11 discharged from the apparatus 10. For example, the invention may incorporate a lime dispenser 98 located above the elongated housing 80 for dispensing lime onto the solids 11 as the solids move along the screw type conveyor 95.

The elongated housing 80 and has a partially open top portion communicating with a recycling tank 110. The recycling tank 110 comprises plural sidewalls 114 and 116 extending upwardly from the plural sidewalls 84 and 86 of the elongated housing 80. As the liquid 12 migrates toward the first end wall 81 of the elongated housing 80, the level of the liquid 12 rises within the elongated housing 80 to fill the recycling tank 110. The recycling tank 110 is filled with liquid 12 any remaining solids 11R after the first and second separation process of the first and second separators 60 and 70.

A recycling pump 120 draws the remaining solids 11R and the liquid 12 from the recycling tank 110 through a pipe 121 and directs the remaining solids 11R and the liquid 12 into a third separator 130 through a pipe 122.

Figure 15:
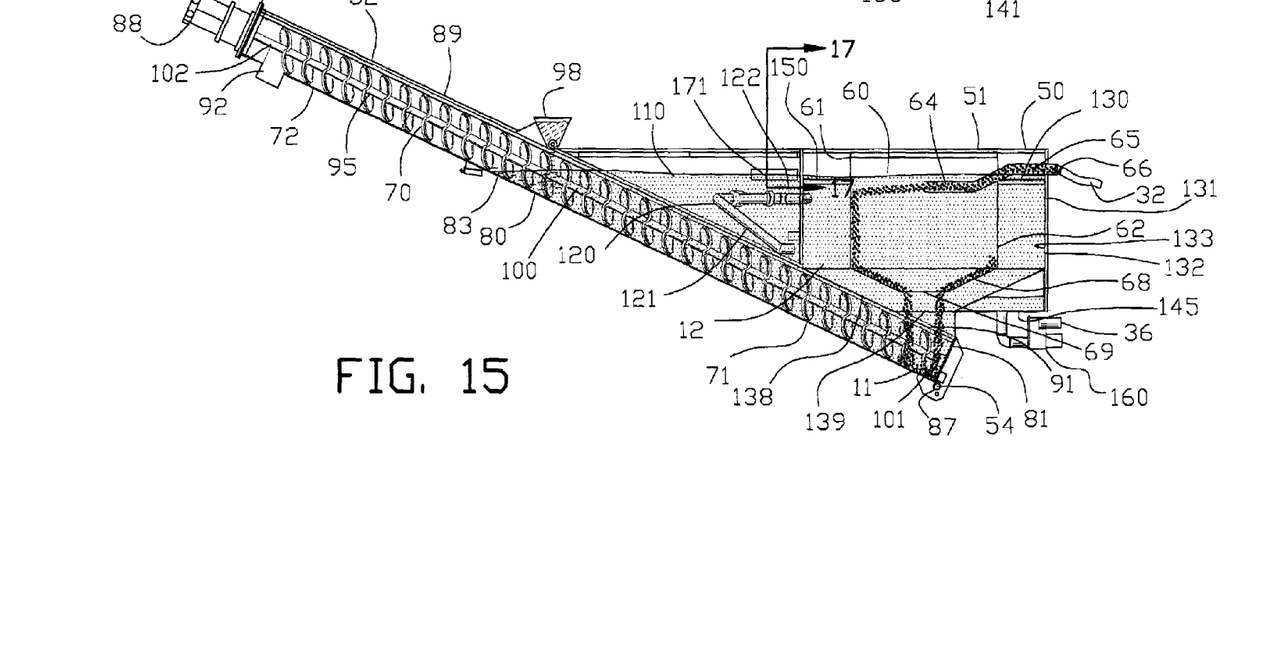
FIG. 15 illustrates the concentrated solids being discharged from the second separator and with the remaining solids and liquid entering a third separator for concentrating the remaining solids within the liquid.
Figure 16:
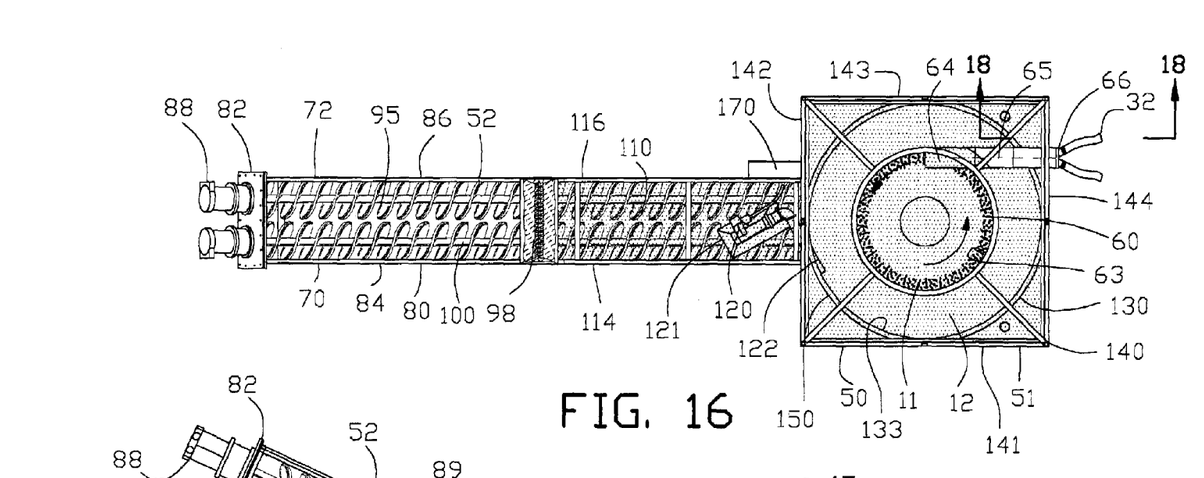
FIG. 16 is a top view of FIG. 15.

The third separator 130 is shown as a cyclone separator coaxially located about the first separator 60 for concentrating the remaining solids 11R within the liquid 12. The third cyclone separator 130 extends between an upper end 131 and a lower end 132. The third cyclone separator 130 is defined by a cylindrical sidewall 133 with the upper end 131 defining a cylindrical opening commensurate in size with the cylindrical sidewall 133.

The pipe 122 from the recycling pump 120 extends through the cylindrical sidewall 133 to be generally tangential with the cylindrical sidewall 133. The lower end of the third cyclone separator 130 includes a partial tapering wall 138 defining a central output aperture 139. The tapering wall 138 extends angularly downwardly from the cylindrical sidewall 133 and terminates in the central output aperture 139.

The tangential input of the remaining solids 11R and the liquid 12 into the third cyclone separator 130 creates a circulation within the third cyclone separator 130. The third cyclone separator 130 concentrates and separates the remaining solids 11R within the liquid 12.

The concentrated remaining solids 11R and the liquid 12 emanating from the central output aperture 139 of the third cyclone separator 130 enters the first opening 91 of the elongated housing 80. The remaining solids 11R are conveyed upwardly by the screw type conveyor 95 from the first end wall 81 to the second end wall 82 of the elongated housing 80 and are separated from the liquid 12. The remaining solids 11R are discharged from the second opening 92. The liquid migrates toward the first end wall 82 of the elongated housing 80 to again enter the recycling tank 110.

Figure 17:
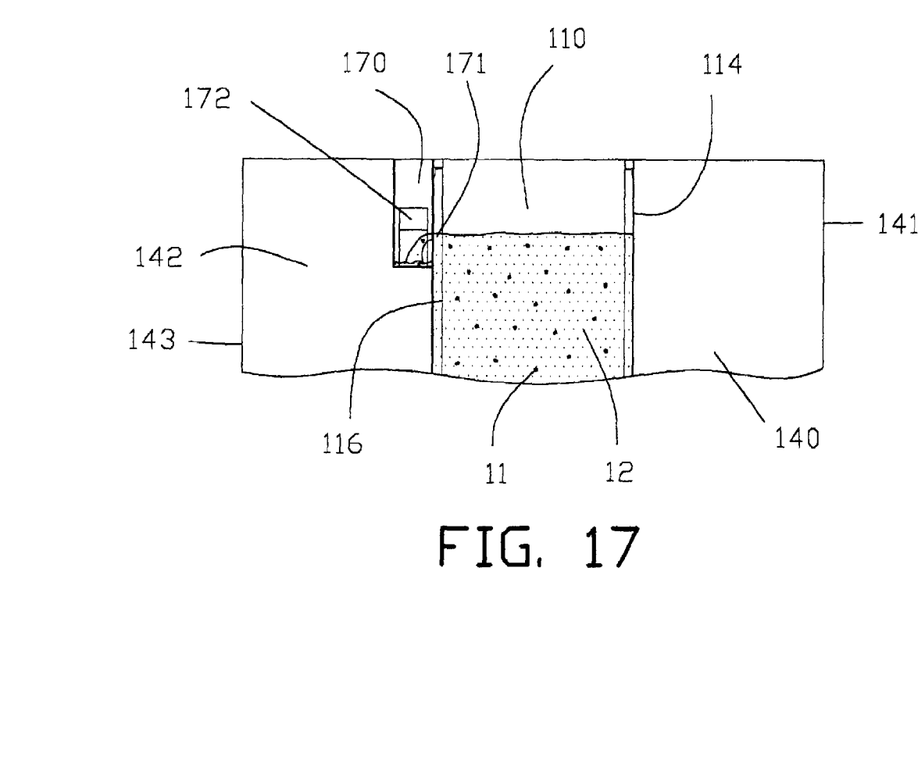
FIG. 17 is an enlarged sectional view long line 17—17 in FIG. 15.
Figure 18:
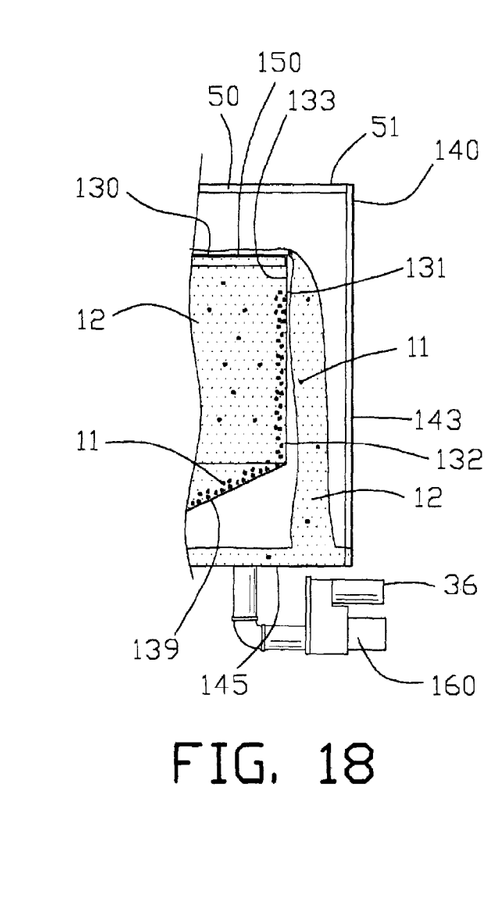
FIG. 18 is an enlarged sectional view long line 18—18 in FIG. 15.

As best illustrated in FIGS. 17 and 18 an output tank or accumulator 140 is located coaxially about the first and third separators 60 and 130. The accumulator 140 comprises a sidewall 141–144 and a bottom wall 145. As the level of the liquid 12 increases, the upper end 131 of the third cyclone separator 130 functions as a weir 150. The upper end 131 of the third cyclone separator 130 enables the liquid 12 to flow from the third cyclone separator 130 into the accumulator 140. The liquid 12 flowing over the weir 150 is essentially free of the solids 11. The liquid 12 flowing over the weir 150 is discharged to the output 139 of the second cyclone separator 130.

An output pump 160 pumps the liquid 12 from the accumulator 140 through the output hose 36 to return the liquid 12 to the basin 16 of the remote location 14. In the event the basin 16 originally contained biologically active material 13, the liquid 12 is returned to the basin 16 along with the biologically active material 13.

The circular motion of the liquid 12 within the cyclone separator 60 coupled with the suction provided by the recycling pump 120 creates a strong vortex within the first cyclone separator 60. The strong vortex within the first cyclone separator 60 allows the solids 11 to be separated from the liquid 12 without disturbing the biological active materials 13 in suspension within the liquid 12. Furthermore, the strong vortex within the first cyclone separator 60 significantly increases the output of the apparatus 10.

As illustrated in FIG. 17 a secondary the weir 170 is interposed between the recycling tank 110 and the accumulator 140. A first weir aperture 171 is defined in the sidewall 116 of the recycling tank 110 whereas a second weir aperture 172 is defined in the sidewall 142 of the accumulator 140. The secondary weir 170 enables the liquid 12 to flow from the recycling tank 110 into the accumulator 140. The liquid 12 flowing over the weir 170 is essentially free of the solids 11. The liquid 12 flowing over the weir 170 is discharged to the output 139 of the second cyclone separator 130.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for separating solids from a liquid, comprising:
    a first separator having an inlet and an outlet;
    an input pump for pumping the solids and the liquid into said inlet of said first separator;
    said first separator circulating the solids and the liquid within the first separator for concentrating the solids for discharge from said outlet of said first separator;
    a second separator having a first and a second opening with said first opening communicating with said outlet of said first separator;
    said second separator extending angularly upwardly for conveying the solids away from said first opening and towards said second opening of said second separator to separate the solids from the liquid;
    a third separator having an inlet and an outlet;
    a transfer pump for pumping the solids and the liquid from said second separator into said inlet of said third separator;
        said third separator circulating the solids and the liquid within the third separator for concentrating the solids for discharge from said outlet of said third separator; and
    said outlet of said third separator communicating with said first opening of said second separator for further separating the solids from the liquid.

2. An apparatus for separating solids from a liquid as set forth in claim 1, including a collector connected to said input pump for collecting the solids and the liquid.

3. An apparatus for separating solids from a liquid as set forth in claim 1, wherein said first separator comprises a first cylindrical cyclone separator defined by a first cylindrical sidewall for circulating the solids and the liquid within said first cylindrical cyclone separator for concentrating the solids about first cylindrical sidewall.

4. An apparatus for separating solids from a liquid as set forth in claim 1, wherein said first separator comprises a first cylindrical cyclone separator defined by a first cylindrical sidewall;
    said inlet of said first cylindrical cyclone separator being defined in said first cylindrical sidewall; and
    said outlet of said first cylindrical cyclone separator being defined in a lower cylindrical end of said first cylindrical cyclone separator.

5. An apparatus for separating solids from a liquid as set forth in claim 1, wherein said first cyclone separator comprises a first cylindrical cyclone separator defined by a first cylindrical sidewall;
    said inlet of said first cylindrical cyclone separator being defined in said first cylindrical sidewall;
    said lower cylindrical end of said first cylindrical cyclone separator being tapered to terminate in said outlet of said first cylindrical cyclone separator.

6. An apparatus for separating solids from a liquid as set forth in claim 1, wherein said second separator comprises an Archimedean screw conveyor.

7. An apparatus for separating solids from a liquid as set forth in claim 1 wherein said second separator comprises an elongate housing defining said first and second openings;
    said elongate housing extending angularly relative to said first separator with said second openings being located above said first opening;
    a spiral conveyor extending between a first and a second end;
    said spiral conveyor being rotatably supported within said elongate housing with said first and second ends of said spiral conveyor being disposed adjacent to said first and second openings of said second separator; and
    a motor rotating said spiral conveyor for conveying the solids from said first opening to be discharged from said second opening of said elongate housing.

8. An apparatus for separating solids from a liquid as set forth in claim 1, wherein said second separator comprises an elongate housing defining said first and second openings;
    said elongate housing extending angularly relative to said first separator with said second openings being located above said first opening;
    a spiral conveyor extending between a first and a second end;
    said spiral conveyor being rotatably supported within said elongate housing with said first and second ends of said spiral conveyor being disposed adjacent to said first and second openings of said second separator;
    a motor rotating said spiral conveyor for conveying the solids upwardly from said first opening to be discharged from said second opening of said elongate housing; and said spiral conveyor and said elongate housing defining a space therebetween for enabling the liquid to drain downwardly along said housing towards said first opening.

9. An apparatus for separating solids from a liquid as set forth in claim 1, including an accumulator having an entry port and an exit port;
a weir interposed between said separator and said entry port of said accumulator for directing liquid from said separator to said accumulator to limit the level of the liquid within said separator.

10. An apparatus for separating solids from a liquid as set forth in claim 1, including an output pump for pumping the liquid from the apparatus.

11. An apparatus for separating solids from a liquid as set forth in claim 1, including a dispenser for dispensing a disinfectant onto the solids before discharge from the apparatus.

12. An apparatus for separating solids from a liquid, comprising:
a first separator having an inlet and an outlet;
an input pump for pumping the solids and the liquid into said inlet of said first separator;
said first separator circulating the solids and the liquid within the first separator for concentrating the solids for discharge from said outlet of said first separator;
a second separator having a first and a second opening with said first opening communicating with said outlet of said first separator;
said second separator extending angularly upwardly for conveying the solids away from said first opening and towards said second opening of said second separator to separate the solids from the liquid;
a third separator having an inlet and an outlet;
a transfer pump for pumping the solids and the liquid from said second separator into said inlet of said third separator;
said third separator circulating the solids and the liquid within the third separator for concentrating the solids for discharge from said outlet of said third separator;
said outlet of said third separator communicating with said first opening of said second separator for further separating the solids from the liquid; and
said third separator is being coaxial with said first separator.

13. A method for separating solids from a liquid, comprising the steps of:
pumping the solids and liquid into a first cyclone separator;
concentrating the solids within the liquid in a first cyclone separator;
separating the concentrated solids from the liquid with an angularly orientated second Archimedean screw separator to convey the concentrated solids from a first opening to be discharged from a second opening;
pumping the remaining solids and liquid from the second Archimedean screw separator into a third cyclone separator;
concentrating the remaining solids from the liquid in the third cyclone separator; and
reintroducing the concentrated remaining solids and the liquid angularly orientated second Archimedean screw separator to convey the concentrated solids from a first opening to be discharged from a second opening;
removing the liquid from the third cyclone separator with a weir.

14. An apparatus for separating solids from a liquid, comprising:
a first cyclone separator having an inlet and an outlet;
an input pump for pumping the solids and the liquid into said inlet of said first separator;
said first cyclone separator circulating the solids and the liquid within said first cyclone separator for concentrating the solids for discharge from said outlet of said first cyclone separator;
a second Archimedean screw separator having a first and a second opening with said first opening communicating with said outlet of said first cyclone separator;
said second Archimedean separator extending angularly upwardly for conveying the solids away from said first opening and towards said second opening of said second separator to separate the solids from the liquid;
a third cyclone separator having an inlet and an outlet;
said third cyclone separator being located coaxially about said first cyclone separator;
a transfer pump for pumping the liquid and any remaining solids from said second Archimedean separator into said inlet of said third cyclone separator;
said third cyclone separator circulating the remaining solids and the liquid within the third separator for concentrating the remaining solids for discharge from said outlet of said third separator; and
said outlet of said third separator communicating with said first opening of said second Archimedean separator for further separating the remaining solids from the liquid;
an accumulator having an entry port and an exit port;
said accumulator being located coaxially about said first and third cyclone separators;
a weir interposed between said third cyclone separator and said entry port of said accumulator for directing liquid from said third cyclone separator to said accumulator to limit the level of the liquid within said third cyclone separator.

15. An apparatus for separating solids from a liquid as set forth in claim 14, including a dispenser for dispensing a disinfectant onto the solids before discharge from the apparatus.

* * * * *